United States Patent
Sawada

(10) Patent No.: US 10,627,316 B2
(45) Date of Patent: Apr. 21, 2020

(54) LASER MICRODISSECTION APPARATUS, ANALYSIS APPARATUS INCLUDING LASER MICRODISSECTION APPARATUS, SAMPLE COLLECTION METHOD, AND DEVICE USED IN LASER MICRODISSECTION APPARATUS

(71) Applicant: National University Corporation Nagoya University, Aichi (JP)

(72) Inventor: Makoto Sawada, Aichi (JP)

(73) Assignee: NATIONAL UNIVERSITY CORPORATION NAGOYA UNIVERSITY, Nagoya-Shi, Aichi (JP)

( * ) Notice: Subject to any disclaimer, the term of this patent is extended or adjusted under 35 U.S.C. 154(b) by 197 days.

(21) Appl. No.: 15/564,577

(22) PCT Filed: Apr. 6, 2016

(86) PCT No.: PCT/JP2016/061222
§ 371 (c)(1),
(2) Date: Oct. 5, 2017

(87) PCT Pub. No.: WO2016/163385
PCT Pub. Date: Oct. 13, 2016

(65) Prior Publication Data
US 2018/0073961 A1 Mar. 15, 2018

(30) Foreign Application Priority Data

Apr. 6, 2015 (JP) .................................. 2015-077840

(51) Int. Cl.
*G01N 1/04* (2006.01)
*G01B 21/00* (2006.01)
(Continued)

(52) U.S. Cl.
CPC ................ *G01N 1/04* (2013.01); *G01B 21/00* (2013.01); *G01N 1/28* (2013.01); *G01N 27/62* (2013.01);
(Continued)

(58) Field of Classification Search
CPC .................. G01N 1/04; G01N 1/2813; G01N 2001/2833; G01N 2001/284
See application file for complete search history.

(56) References Cited

U.S. PATENT DOCUMENTS 6,495,195 B2* 12/2002 Baer ..................... G01N 1/2813
427/2.11
6,743,601 B1* 6/2004 Bonner ................ G01N 1/2813
382/133
(Continued)

FOREIGN PATENT DOCUMENTS

EP 1137923 B1 11/2009

OTHER PUBLICATIONS

European Search Report issued in PCT/JP2016/061222, dated Mar. 5, 2018.
(Continued)

*Primary Examiner* — Herbert K Roberts
(74) *Attorney, Agent, or Firm* — McDermott Will & Emery LLP

(57) ABSTRACT

The present invention addresses the problem of providing a laser microdissection apparatus having good operational efficiency. The laser microdissection apparatus, comprising sample movement means capable of retaining a slide, device movement means on which a device having a thermofusible film for transferring a sample can be mounted, a laser irradiation part for irradiating the sample with a dissection laser light, storage means for correlating and storing positional coordinates of the sample in the location irradiated by (Continued)

the dissection laser light and positional coordinates of the thermofusible film in a location where the collected sample is adhered, and a movement means drive control part for controlling driving of the sample movement means and the device movement means on the basis of the positional coordinates of the sample and the thermofusible film. The dissection laser light is radiated through the device onto the sample from below the device.

10 Claims, 6 Drawing Sheets

(51) Int. Cl.
    *G01N 1/28*     (2006.01)
    *H01J 49/04*     (2006.01)
    *G01N 27/62*     (2006.01)
    *G01N 1/06*     (2006.01)

(52) U.S. Cl.
    CPC ............... *H01J 49/04* (2013.01); *G01N 1/06* (2013.01); *G01N 1/2813* (2013.01); *G01N 2001/045* (2013.01)

(56) References Cited

U.S. PATENT DOCUMENTS

| | | | |
|---|---|---|---|
| 6,887,703 B2 | 5/2005 | Baer et al. | |
| 2004/0252291 A1* | 12/2004 | Schutze | G01N 1/2813 356/36 |
| 2006/0087643 A1* | 4/2006 | Donovan | G01N 1/44 356/36 |
| 2014/0190946 A1 | 7/2014 | Gogler | |

OTHER PUBLICATIONS

Japan Science and Technology Agency (JST), Nagoya University, "Intracerebral Distribution of a Molecule Related to Alzheimer's Disease Successfully Measured in Three Dimensions; LMD/MS: New Imaging Mass Spectrometry Technique Established", (online), (retrieved Mar. 16, 2015), Internet <URL:http://www.jst.go.jp/pr/announce/20140520/>.

Written Opinion of the International Searching Authority issued in PCT/JP2016/061222, dated Jun. 14, 2016 (English Translation).

* cited by examiner

Gravity Direction

LASER MICRODISSECTION APPARATUS, ANALYSIS APPARATUS INCLUDING LASER MICRODISSECTION APPARATUS, SAMPLE COLLECTION METHOD, AND DEVICE USED IN LASER MICRODISSECTION APPARATUS

CROSS-REFERENCE TO RELATED APPLICATION

This application is the U.S. National Phase under 35 U.S.C. § 371 of International Patent Application No. PCT/JP2016/061222, filed on Apr. 6, 2016, which in turn claims the benefit and priority from Japanese Patent Application Number 2015-077840, filed Apr. 6, 2015 the subject matters of which are hereby incorporated by reference.

FIELD OF THE INVENTION

The present invention relates to a laser microdissection apparatus, an analysis apparatus including the laser microdissection apparatus, a sample collection method, and a device used in the laser microdissection apparatus. The present invention relates particularly to a laser microdissection apparatus in which a dissection laser light irradiation part is disposed below a device, and dissection laser light is radiated to a sample from below the device, whereby excellent working efficiency is obtained in the sequence from sample collection to analysis thereof, such as in dripping an analysis reagent on the device after sample collection. The present invention furthermore relates to an analysis apparatus including the laser microdissection apparatus having excellent working efficiency, a sample collection method, and a device used in the laser microdissection apparatus having excellent working efficiency.

DESCRIPTION OF THE RELATED ART

In the field of life science research, there has been a recent need to precisely analyze where certain molecules are located in a biological sample, or what molecules are present at a site of interest in a biological sample.

There is also a demand for imaging mass spectrometry in which the types of molecules included in a biological sample being observed by a microscope are displayed together with the sample during analysis thereof, rather than the sample simply being extracted and analyzed. As an apparatus for meeting this demand, a mass microscope is commercially available whereby a biological sample can be observed by a microscope and also subjected to mass spectrometry.

In the conventional mass spectrometry method, mass spectrometry is performed by radiating laser light to a sample to ionize the irradiated portion of the sample. (The laser light for ionizing the sample in a mass spectrometer is sometimes referred to below as "ionizing laser light.") Consequently, it is possible to continuously analyze a sample by irradiating the sample with ionizing laser light, then moving the sample a length corresponding to the diameter of the ionizing laser light and again radiating the ionizing laser light. However, in mass spectrometry, ionization occurs not only in the portion irradiated by the ionizing laser light, and the problem arises that even when the ionizing laser light is radiated after the sample is moved a length corresponding to the diameter of the ionizing laser light, ionization occurs at the same time also in the portion of the sample irradiated prior to the movement. The problem therefore arises that it is difficult to continuously move the location irradiated with the ionizing laser light, and because the spatial resolution is on the order of about 200 μm depending on the diameter of the ionizing laser light used, continuous precise analysis of the sample is difficult. The portion of a biological sample irradiated by the ionizing laser light also cannot be completely ionized, which leads to problems in the quantitativity of the analysis results as well. Furthermore, the conventional mass microscope is simply a combination of a microscope and a mass spectrometer, which creates the problem of increased apparatus size.

In order to solve the abovementioned problems, the inventors announce their discovery that: (1) using a thermofusible film, by first affixing a small piece to the film and performing mass spectrometry on the film, a small piece having position information can be comprehensively excised from a certain portion on a biological tissue, and highly sensitive mass spectrometry is possible in which peaks having excess components intermingled therein are suppressed; (2) by improving an on-line linked-operation coordinate reproduction stage (measurement sample fixing apparatus), modifying coordinate reproduction software, and modifying the focal point diameter of the laser to 1 μm, spatial resolution can be enhanced; and (3) because positioning is performed using a coordinate reproduction function, position information in a continuous tissue section can be accurately reproduced and imaging mass spectrometry in three dimensions can also be realized (see Non-patent Document 1).

PRIOR ARTS LIST

Non-Patent Document

[Non-patent Document 1] 20 May 2014, Japan Science and Technology Agency (JST), Nagoya University, "Intracerebral Distribution of a Molecule Related to Alzheimer's Disease Successfully Measured in Three Dimensions; LMD/MS: New Imaging Mass Spectrometry Technique Established", (online), (retrieved 16 Mar. 2015), Internet <URL: http://www.jst.go.jp/pr/announce/20140520/>

SUMMARY OF THE INVENTION

Problems to be Solved by the Invention

In the LMD described in Non-patent Document 1, continuous minute regions of a sample can be arranged on a thermofusible film at a desired spacing and in such a manner that positional coordinates of the sample and positional coordinates of the thermofusible film are correlated, and two-dimensional and three-dimensional mass imaging can therefore be performed.

However, the LMD described in Non-patent Document 1 was developed using an inverted microscope as a base, with Matrix-Assisted Laser Desorption/Ionization Time-of-Flight Mass Spectrometry (MALDI-TOF-MS) in mind. An optical system for observing the sample is disposed at the bottom of the apparatus in an inverted microscope, and in the LMD described in Non-patent Document 1, the thermofusible film for adhering the collected samples is therefore disposed above the slide on which the sample is mounted, and the light source for the dissection laser light is disposed at the top of the apparatus.

Therefore, because a sample adhesion surface of the thermofusible film faces downward, when an analysis reagent or the like is dripped onto the adhered samples, it is necessary to temporarily remove the thermofusible film from LMD and place the sample adhesion surface of the thermofusible film in an upward orientation. Operation therefore becomes complex and the analysis efficiency is poor.

In the LMD described in Non-patent Document 1, the thermofusible film is brought into contact with the sample and laser light is radiated. However, when the sample used is a section of a frozen block produced using an embedding agent, for example, the sample surface is uneven on a microscopic level and gaps occur between the thermofusible film and the sample, resulting in potentially irregular transfer of samples to the thermofusible film.

A commercially available thermofusible film is a planar film having no segmentation. Therefore, when an analysis reagent is dripped onto the thermofusible film on which a sample is adhered, the analysis reagent scatters on the thermofusible film, and there is a risk of contamination. The spacing at which samples are adhered may be increased in order to prevent contamination, but when the spacing at which samples are adhered is increased, the problem arises that the number of sample spots that can be analyzed for each thermofusible film is reduced, and analysis efficiency decreases.

The present invention was developed to overcome the problems of the prior art described above, and as a result of concentrated investigation, the present invention is configured so that the sample is disposed on a top side and the device having the thermofusible film for adhering a collected sample is disposed on a bottom side in LMD. The inventors accomplished the present invention by newly discovering that when the dissection laser light is radiated from below the device, the collected sample adheres to a top surface of the device, and an analysis reagent can therefore be dripped directly thereon.

Specifically, an object of the present invention is to provide a laser microdissection apparatus, an analysis apparatus including the laser microdissection apparatus, a sample collection method, and a device used in the laser microdissection apparatus.

Means to Solve the Problems

The present invention relates to the laser microdissection apparatus, the analysis apparatus including the laser microdissection apparatus, the sample collection method, and the device used in the laser microdissection apparatus described below.

(1) A laser microdissection apparatus, comprising:
sample movement means capable of retaining a slide on which a sample is mounted and moving the slide in a horizontal direction and a vertical direction;
device movement means on which a device having a thermofusible film for transferring a sample can be mounted, the device movement means capable of moving the device in the horizontal direction;
a laser irradiation part for irradiating the sample with a dissection laser light, excising the sample in a location irradiated with the dissection laser light, and adhering the excised location to the thermofusible film as a collected sample;
storage means for correlating and storing positional coordinates of the sample in the location irradiated by the dissection laser light and positional coordinates of the thermofusible film in a location where the collected sample is adhered; and
a movement means drive control part for controlling driving of the sample movement means and the device movement means on the basis of the positional coordinates of the sample and the positional coordinates of the thermofusible film stored in the storage means;
the dissection laser light being radiated through the device onto the sample from below the device.

(2) The laser microdissection apparatus of (1) above, comprising pressing means for pressure-bonding the slide and the device having the thermofusible film.

(3) The laser microdissection apparatus of (2) above, wherein the pressing means is a frame for retaining the slide.

(4) The laser microdissection apparatus of (2) or (3) above, wherein:
the sample movement means has an arm for retaining the frame; and
the pressing means includes the arm.

(5) The laser microdissection apparatus of (3) or (4) above, wherein:
the sample movement means has a motor for driving the arm for retaining the slide; and
the pressing means includes at least the motor and the arm, and the arm can be urged toward the device by the motor.

(6) The laser microdissection apparatus of any one of (1) through (5) above, comprising a device having a substrate and a thermofusible film formed on the substrate to transfer a sample.

(7) The laser microdissection apparatus of (6) above, wherein a surface of the thermofusible film is formed of regions having different hydrophilicity, a high-hydrophilicity region being surrounded by a low-hydrophilicity region.

(8) An analysis apparatus comprising the laser microdissection apparatus of any one of (1) through (7) above.

(9) The analysis apparatus of (8) above, wherein the analysis apparatus is one type selected from a mass spectrometer, an analysis apparatus including chromatography, an elemental analysis apparatus, a nucleic acid sequence analysis apparatus, and a microchip analysis apparatus.

(10) A sample collection method for collecting a sample on a device having a thermofusible film using a laser microdissection apparatus, the sample collection method comprising:
a step for superposing a position of a sample to be collected on a position to which the sample is to be transferred on the thermofusible film of the device;
a pressing step for pressure-bonding the sample and the thermofusible film of the device; and
a sample collection step for radiating the dissection laser light from below the device, excising a location of the sample irradiated by the dissection laser light, and adhering the excised location to the thermofusible film as a collected sample.

(11) A device used in a laser microdissection apparatus, wherein
the device includes a substrate and a thermofusible film formed on the substrate to transfer a sample; and
a surface of the thermofusible film is formed of regions having different hydrophilicity, a high-hydrophilicity region being surrounded by a low-hydrophilicity region.

(12) The device of (11) above, wherein an electroconductive layer is formed between the thermofusible film and the substrate.

Advantageous Effects of the Invention

In LMD according to the present invention, the sample is disposed on a top side and the device having the thermofusible film for adhering a collected sample is disposed on a bottom side. The collected sample is therefore adhered to a top side of the device, and dripping or the like of an analysis reagent subsequent to LMD can therefore be performed without inversion or another operation. The apparatus can therefore have a simple configuration, and working efficiency is enhanced.

BRIEF DESCRIPTION OF THE DRAWINGS

FIG. 6 illustrates an example in which the samples 34a, b, c in FIG. 6(1) are adhered to the thermofusible film 22 illustrated in FIG. 6(2);

DESCRIPTION OF THE PREFERRED EMBODIMENTS

The laser microdissection apparatus, the analysis apparatus including the laser microdissection apparatus, the sample collection method, and the device used in the laser microdissection apparatus according to the present invention will be described in detail below.

Figure 1:
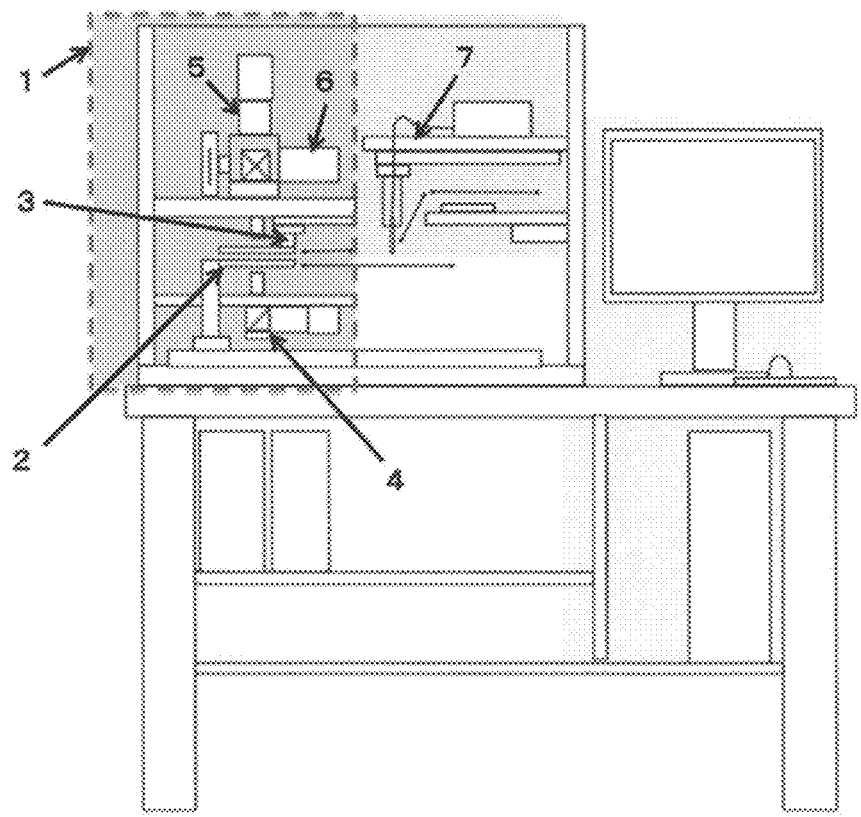
FIG. 1 is a schematic view of the LMD 1 (the portion surrounded by dashed lines in FIG. 1) of the present invention.

FIG. 1 is a schematic view of an LMD 1 (the portion surrounded by dashed lines in FIG. 1), and the LMD 1 includes at least: (a) a device movement means 2 on which a device having a thermofusible film for transferring a sample can be mounted, the device movement means 2 being capable of moving the device in the horizontal direction; (b) a sample movement means 3 for retaining a slide on which the sample is mounted, the sample movement means 3 being capable of moving the slide in the horizontal direction and the vertical direction; (c) a laser irradiation part 4 for radiating a dissection laser light to the sample, excising a sample at the location irradiated by the dissection laser light, and adhering the excised sample as a collected sample to the thermofusible film; and a storage means and a movement means drive control part not illustrated in the drawing. In the LMD 1 of the present invention, the dissection laser light is radiated from below the device, and the laser irradiation part 4 is therefore disposed below the position at which the device is set. The LMD 1 illustrated in FIG. 1 furthermore includes a light source 5 for radiating light for observing the collected sample, and a CCD or other imaging apparatus 6 for acquiring an image.

A sample collected by the LMD 1 of the present invention may be analyzed by a publicly known analysis method (apparatus). FIG. 1 illustrates an example of a combination with LC-MS, in which the device after collection of the sample is sent to a liquid handling part 7 by the device movement means 2 and a solution for LC-MS is dripped onto the device, and analysis is then performed by LC-MS. Examples of analysis methods (apparatuses) other than LC-MS include an HPLC-fluorescence spectroscope, an HPLC-electrochemical detector, or another analysis apparatus in which chromatography is included by liquefying a sample adhered to a thermofusible film, an electron beam microanalyzer, an X-ray photoelectron spectroscope, or another elemental analysis apparatus, a nucleic acid sequence analysis apparatus for amplifying a gene by PCR or LCR and analyzing a DNA sequence included in the sample using a sequencer, a microchip analysis apparatus such as a DNA chip whereby DNA is hybridized with a nucleic acid included in the sample as a template or an antibody chip for reacting an antibody with a protein, and the like.

The LMD 1 of the present invention can also be combined as a sample collection apparatus with the abovementioned mass spectrometer, analysis apparatus including chromatography, elemental analysis apparatus, nucleic acid sequence analysis apparatus, or microchip analysis apparatus. Furthermore, when the LMD 1 of the present invention is used, a collected sample can be adhered/arranged on the thermofusible film at a desired spacing, and the LMD 1 of the present invention can therefore also be used as an apparatus for manufacturing a DNA chip or an antibody chip, for example.

The device movement means 2 illustrated in FIG. 1 includes a device mounting stand on which the device can be mounted, a drive source not illustrated in the drawing for moving the device mounting stand in the horizontal direction (X- and Y-axis directions), and a driving force transmission mechanism for transmitting driving force to the device mounting stand. A pulse motor, an ultrasonic motor, or the like may be used as the drive source. The driving force transmission mechanism used may be a driving force transmission mechanism for driving the device (chip) mounting stand used in a microscope or the like, for example, or another publicly known mechanism.

Figure 2:
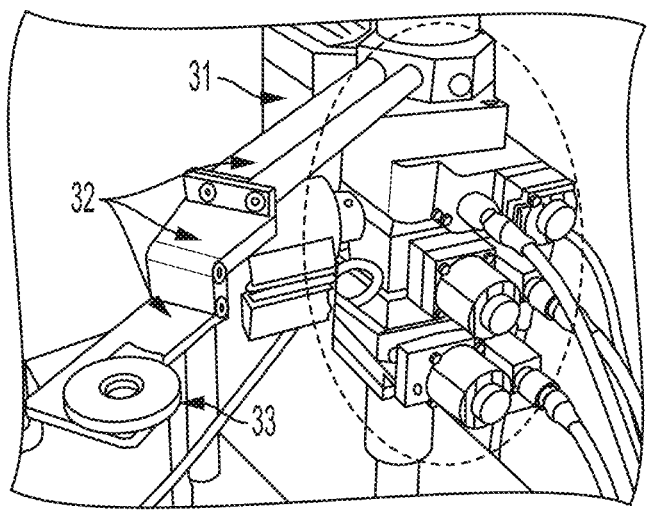
FIG. 2 is a photograph substituting for a drawing, and roughly illustrates the sample movement means 3.

FIG. 2 is a photograph roughly illustrating the sample movement means 3. The sample movement means 3 illustrated in FIG. 2 includes an arm 32, at one end of which a slide carrying a sample can be mounted, and the other end of which can be attached to an arm support column 31, and the arm support column 31 whereby the arm 32 can be rotated in the horizontal direction (X- and Y-axis directions) and moved in the vertical direction (Z-axis direction). The drive source for rotating the arm 32 in the horizontal direction and moving the arm 32 in the vertical direction, and the driving force transmission mechanism for transmitting the driving force of the drive source to rotate the arm 32 and move the arm 32 in the vertical direction are included in the elliptical portion in FIG. 2. A pulse motor, an ultrasonic motor, or the like may be used as the drive source. The driving force transmission mechanism used may be an arm mechanism for sample movement in an automated analysis apparatus, for example, or another publicly known arm mechanism capable of horizontally directed rotation and vertically directed movement. The sample movement means 3 is not limited to the embodiment exemplified in FIG. 2, and is not particularly limited insofar as a sample can be moved in the horizontal direction and the vertical direction thereby.

When there is a gap between the sample and the thermofusible film of the device, the collected sample does not readily adhere to the thermofusible film. The LMD 1 of the present invention therefore includes a pressing means for pressure-bonding the device having the thermofusible film and the slide on which the sample is mounted. FIG. 2 illustrates an example in which the pressing means is formed by a heavy frame 33 made of a metal or the like such as stainless steel or titanium.

Figure 3:
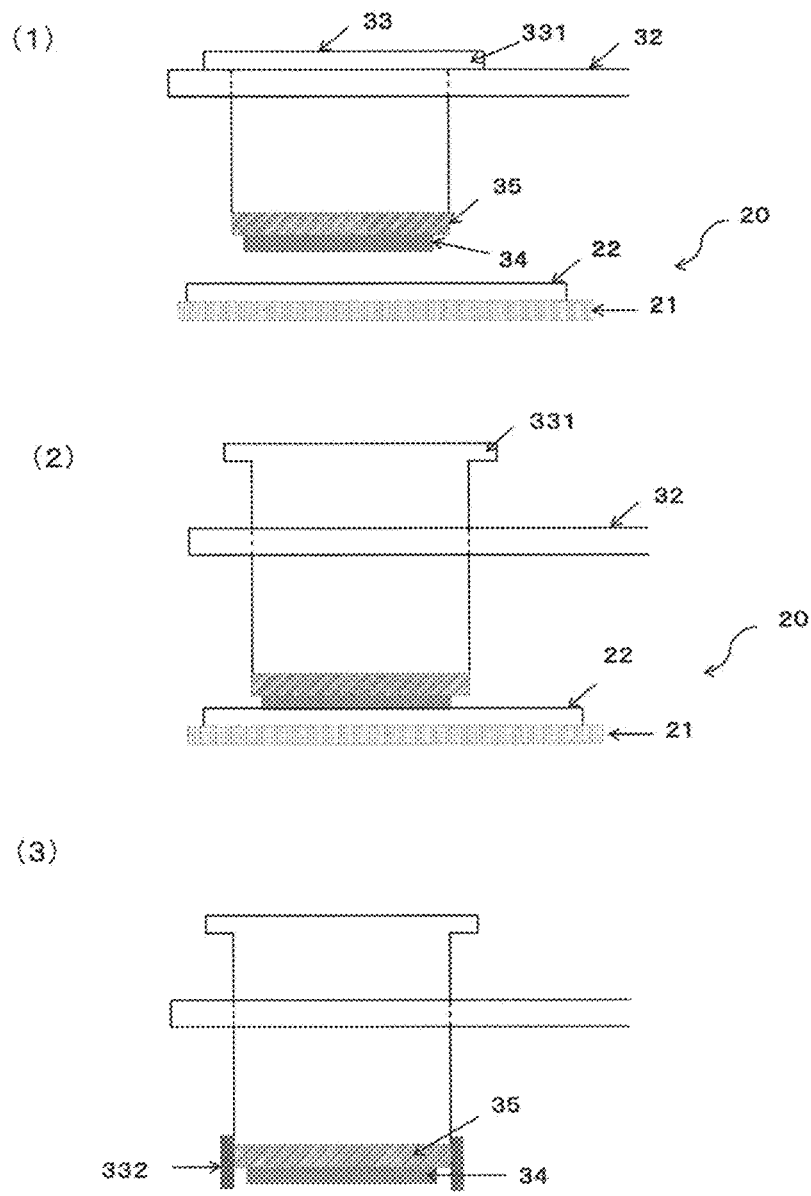
FIG. 3 is a view illustrating an example of the operation of a first embodiment of the pressing means.

FIG. 3 is a view illustrating an example of the operation of a first embodiment of the pressing means. FIG. 3(1) is a side view illustrating a state prior to pressing, in which the cross section of the frame 33 as the pressing means is substantially convex, and the frame 33 is inserted to be able to slide in a frame insertion hole formed in a distal end of the arm 32. A lower part of the frame 33 is configured so that a slide 35 on which a sample 34 is mounted can be detachably attached thereto, and a locking groove, a locking spring mechanism, or the like, for example, is formed therein. Meanwhile, a device 20 including a substrate 21 and a thermofusible film 22 formed on the substrate 21 to transfer a sample is mounted on the device movement means 2 of the LMD 1.

In the state prior to pressing in FIG. 3(1), a top part 331 of the frame 33 is formed to be larger than the frame insertion hole, and the frame 33 is thereby locked to the arm 32. As illustrated in FIG. 3(2), the frame 33 is also lowered by the lowering of the arm 32, and by lowering the arm 32 even after the sample 34 has come in contact with the thermofusible film 22, the sample 34 can be pressure-bonded to the thermofusible film 22 by the weight of the frame 33. The degree of pressure-bonding between the sample 34 and the thermofusible film 22 may be adjusted by the weight of the frame 33. The shape of the frame 33 is not particularly limited insofar as the frame can be slidably inserted in the arm 32, and the shape of the frame 33 may be adjusted to be circular, square, rectangular, or another shape as appropriate for the shape of the slide on which the sample is mounted. When sample collection conditions or the like are to be observed, a configuration may be adopted in which the frame 33 has a hollow shape and the frame 33 can be observed from above. A misalignment prevention member made of silicone rubber, synthetic rubber, or the like may also be provided to the frame 33 to prevent misalignment when the sample 34 comes in contact with the thermofusible film 22, as illustrated in FIG. 3(3).

Figure 4:
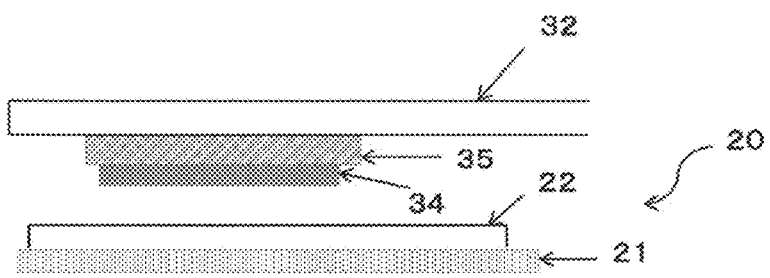
FIG. 4 is a view illustrating a second embodiment of the pressing means.

FIG. 4 is a view illustrating a second embodiment of the pressing means. In the embodiment illustrated in FIG. 4, a locking groove or the like, capable of detachably attaching the slide 35 on which the sample 34 is mounted, is formed in the arm 32. The sample 34 is brought into contact with the thermofusible film 22 by the lowering of the arm 32. After contact, transmission between the driving force transmission mechanism and the arm 32 is released, and the sample 34 can thereby be pressure-bonded to the thermofusible film 22 by the weight of the arm 32 itself. The slide 35 on which the sample 34 is mounted is attached to the arm 32 in the second embodiment illustrated in FIG. 4, but a configuration may be adopted as a third embodiment in which the slide 35 is attached to the frame 33, and the frame 33 is detachably attached to the arm 32. Unlike in the first embodiment, there is no need for the frame 33 in the third embodiment to slide with respect to the arm 32, and the frame 33 must be fixed to the arm 32. In the case of the third embodiment, the pressing means is configured from the frame 33 and the arm 32, and the sample 34 can therefore be pressure-bonded by the thermofusible film 22.

The pressing means is formed by the frame 33 and/or the arm 32 in the second and third embodiments described above, but the pressing means may also be configured to include the drive source and the driving force transmission mechanism in addition to the frame 33 and/or the arm 32, as a fourth embodiment. In the case of the fourth embodiment, a configuration may be adopted in which transmission between the driving force transmission mechanism and the arm 32 is not released after the sample 34 comes in contact with the thermofusible film 22, and downward urging of the arm 32 is continued.

The first through fourth embodiments described above are embodiments in which the pressing means is configured using constituent members of the LMD 1, but the pressing means is not particularly limited insofar as the sample 34 and the thermofusible film 22 are pressure-bonded thereby. For example, the pressing means may be formed by a sandwiching means for holding the slide 35 and the device 20 therein from above and below after the slide 35 is placed on the device 20. Providing the pressing means makes it possible to closely adhere the sample 34 and the thermofusible film 22. As a result, it is possible to eliminate a gap between the sample 34 and the thermofusible film 22 during irradiation by the dissection laser light, and the sample can therefore be excised with enhanced precision.

Figure 5:
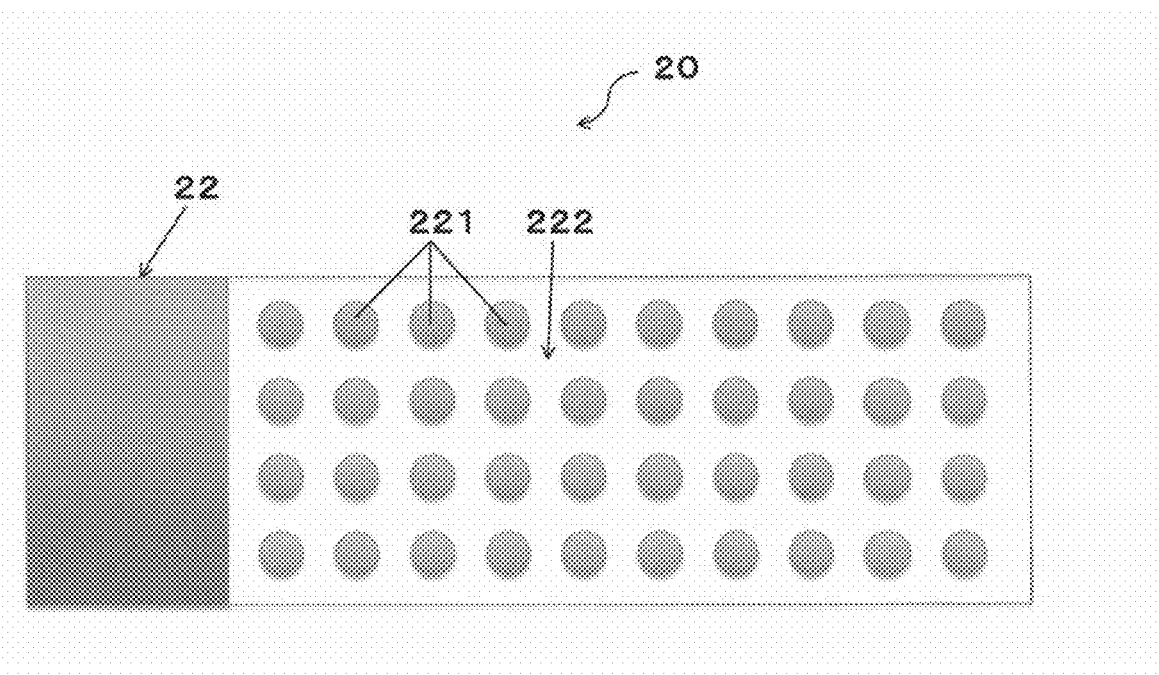
FIG. 5 is a top view of the device 20 of the present invention.

FIG. 5 is a top view of the device 20 of the present invention. The device 20 of the present invention is characterized in that a surface of the thermofusible film 22 is formed of regions having different hydrophilicity. In the example illustrated in FIG. 5, circular high-hydrophilicity regions 221 are formed, and the high-hydrophilicity regions 221 are surrounded by a low-hydrophilicity region 222 on the periphery thereof.

The terms "high-hydrophilicity regions" and "low-hydrophilicity region" in the present invention refer not to absolute values of hydrophilicity but to the degree of hydrophilicity of the two regions relative to each other. The device 20 of the present invention is not particularly limited insofar as a region having relatively low hydrophilicity is formed on the periphery of a high-hydrophilicity region therein. For example, a layer of the thermofusible film 22 may be formed on the substrate 21 and then covered by a mask having a hole in a location corresponding to a high-hydrophilicity region and subjected to a hydrophilizing treatment. Alternatively, the layer of the thermofusible film 22 may be covered by a mask having a hole in a location corresponding to a low-hydrophilicity region and subjected to a hydrophobizing treatment. A hydrophilizing treatment and a hydrophobizing treatment may also both be performed.

The hydrophilizing treatment may be performed by a publicly known method, examples of which include plasma treatment, surfactant treatment, PVP (polyvinylpyrrolidone) treatment, photocatalysis, and the like. For example, by subjecting the thermofusible film 22 exposed from the mask to plasma treatment for 10 to 30 seconds, hydroxyl groups can be introduced on the surface thereof. The hydrophobizing treatment may also be performed by a publicly known method, examples of which include hexamethyldisilazane (HMDS) treatment and treatment by a fluorine compound such as a trifluoromethyl group.

As a method other than a hydrophilizing treatment and/or hydrophobizing treatment using a mask, printing may be performed by an inkjet printer or the like using a fluororesin-based ink, an organosilane, a silicon-based ink, an alkali-soluble resist ink, or another water repellent ink.

Wells can be produced by subjecting the surface of the thermofusible film 22 to a hydrophilizing treatment and/or a hydrophobizing treatment. The wells in the device 20 of the present invention are substantially planar wells produced by modifying the surface of the thermofusible film 22 at an atomic level or by coating the surface of the thermofusible film 22, and differ from wells of a publicly known microplate having depressions (wells) for introduction of a solution or the like. Because the surface of the thermofusible film 22 is in a substantially planar state, adhesion thereof to the sample is unimpeded during dissection. Even when an analysis reagent is dripped onto the high-hydrophilicity regions after the sample is adhered to the high-hydrophilicity regions by LMD, the analysis reagent does not flow out of the wells, and contamination therefore does not occur.

The size and shape of the high-hydrophilicity regions may be adjusted, as appropriate, in accordance with the method used to analyze the sample collected by LMD. For example, when LC-MS or nucleic acid amplification is performed, the high-hydrophilicity regions may be sized so that at least the amount of the analysis reagent necessary for analysis stays in the high-hydrophilicity regions by surface tension.

The substrate 21 is not particularly limited insofar as the dissection laser light can pass through the substrate 21 and the thermofusible film 22 can be formed thereon, and the substrate 21 may be produced from glass or an optically transparent resin, for example. The thermofusible film 22 may be laminated on the substrate 21 using spin coating or the like.

The thermofusible film 22 is not particularly limited insofar as the thermofusible film is melted by the dissection laser light radiated from the laser irradiation part 4 described hereinafter and can adhere to the collected sample without denaturing the collected sample. Heat denaturation of the sample can be prevented by using a thermofusible film having a low melting point, and a thermofusible film having a melting point on the order of approximately 50 to 70° C. is therefore preferably used as a raw material thereof, examples of which include ethyl vinyl acetate (EVA), polyolefin, polyamide, acrylic, polyurethane, and the like. A naphthalene cyanine dye or other organic dye may be added to the thermofusible film to selectively absorb the spectrum in the wavelength region of the dissection laser light source, and a suitable organic dye may be selected in accordance with the wavelength region of the dissection laser light source used. The thermofusible film 22 may be produced by appropriately blending the abovementioned thermofusible film and an organic dye, and a commercially available thermofusible film may also be used. Examples of commercially available thermofusible films include a thermofusible transfer film (manufactured by Electro Seal Corporation), thermofusible EVA film (manufactured by Sigma-Aldrich Japan), and the like.

When MALDI-TOF-MS is to be used after collection of a sample by LMD, the device 20 may be subjected to electroconductive treatment in advance, e.g., a layer of a metal or other electroconductive material may be formed between the substrate 21 and the thermofusible film 22. Including forming an electrode from an electroconductive metal in each of the high-hydrophilicity regions 221 and measuring an electric current variation after dripping the analysis reagent, the device 20 of the present invention is not used solely for sample collection by LMD, but can be used for various analyses such as direct analysis of a collected sample on the device 20.

In order to minimize the size of the irradiation spot, single-mode fiber output laser light is preferably used as the dissection laser light source included in the laser irradiation part 4, and a high-NA long focal length objective lens for near infrared is preferably used for light condensing. A dissection laser light source is preferred that is capable of generating pulsed laser light having a pulse width of 0.1 milliseconds to 100 milliseconds, preferably 5 milliseconds, a wavelength of 785 nanometers to 900 nanometers, preferably 808 nanometers, an output of 0.2 watts to 0.3 watts, and an irradiation laser power of 0.1% to 100%, preferably 80% to 100%, and a Z-808-200-SM (manufactured by Lucir Inc.) or the like is cited as a specific example thereof.

Figure 6:
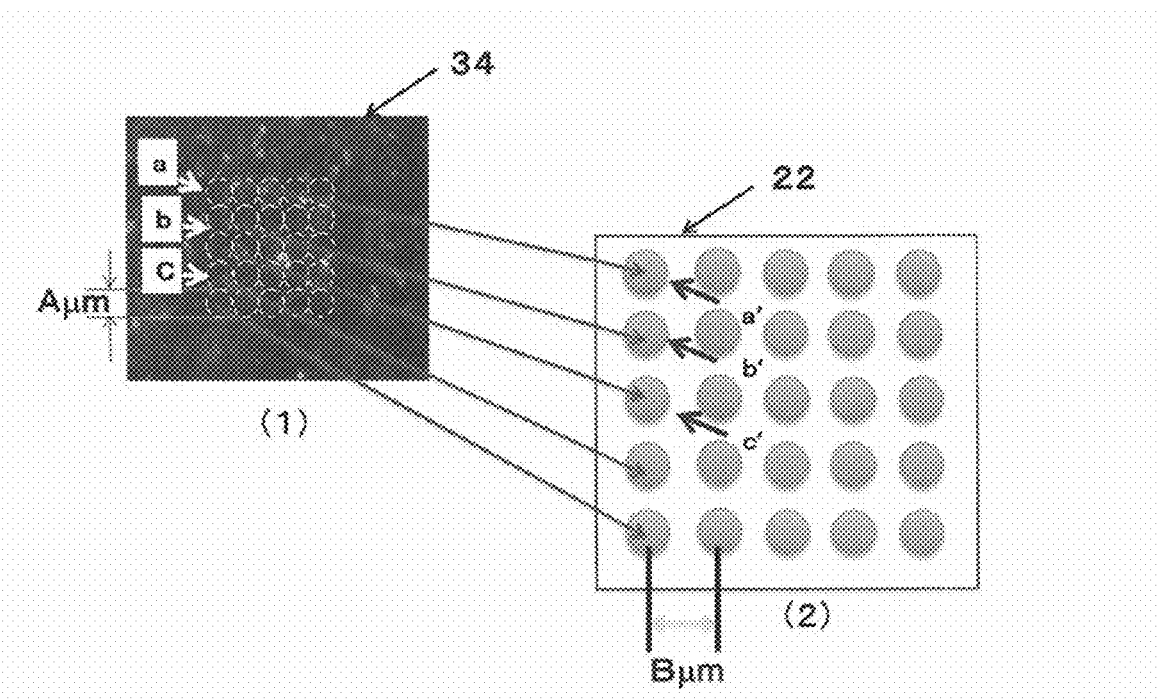
FIG. 6 is a view representing the relationship between the positional coordinates of the sample in the location irradiated by the dissection laser light and the positional coordinates of the thermofusible film 22 to which the collected sample is adhered.

FIG. 6 is a view representing the relationship between the positional coordinates of the sample in the location irradiated by the dissection laser light and the positional coordinates of the thermofusible film 22 to which the collected sample is adhered, and FIG. 6 illustrates an example of continuous excision of the sample. For example, when the sample 34 in FIG. 6(1) is continuously excised in the sequence a, b, c, (i) the device 20 is moved by the device movement means 2 to the position irradiated by the dissection laser light. (ii) The portion a of the sample 34 is then moved by the sample movement means 3 to a position superposed on the location a' of the thermofusible film 22 where the collected sample a is adhered, and the arm 32 is lowered in the vertical direction, whereby the sample 34 is pressure-bonded to the thermofusible film 22. (iii) By irradiation with the dissection laser light, the sample collected from the location a of the sample 34 is adhered at the position of a' on the thermofusible film 22. The arm 32 is then raised in the vertical direction, whereby the sample 34 is separated from the thermofusible film 22, and a sample 34a is adhered to a predetermined location of the thermofusible film 22. By repeating the above procedures (i) through (iii) for samples 34b, c, the samples 34b, c can be adhered to portions b', c' of the thermofusible film 22.

Regarding the size A of the sample collected from the sample 34, the size of the excised sample may be changed according to purpose or a target tissue section. For example, a sample 1 μm to 5 μm in the case of cell substructure analysis or when high spatial resolution is desired, 15 μm to 30 μm when collecting a single cell, or 50 μm to 100 μm when collecting from cancer, a degenerated site, or the like may be excised and collected from the sample 34 by dissection laser light irradiation. Regarding the size of the excised sample, a sample the same size as the diameter of the dissection laser light can also be excised by adjusting the diameter and intensity of the irradiated dissection laser light, and a sample larger than the diameter of the dissection laser light can also be excised by increasing the intensity or irradiation time of the dissection laser light. The diameter or intensity of the dissection laser light may be adjusted as appropriate for the sample to be collected. The diameter of the dissection laser light may be focused using an optical aperture, a condenser lens, or the like. The intensity of the dissection laser light may be adjusted by varying the voltage of a laser oscillator using a variable resistance or the like.

In the present invention, samples collected from the sample 34 can be adhered to the thermofusible film 22 at an arbitrary spacing larger than the spacing between samples prior to collection thereof. Consequently, the spatial resolution of analysis can be enhanced by adjusting the spacing at which the collected samples are adhered in accordance with such factors as the spatial resolution of the analysis apparatus for analyzing the collected samples, or a pre-treatment of the samples.

Figure 7:
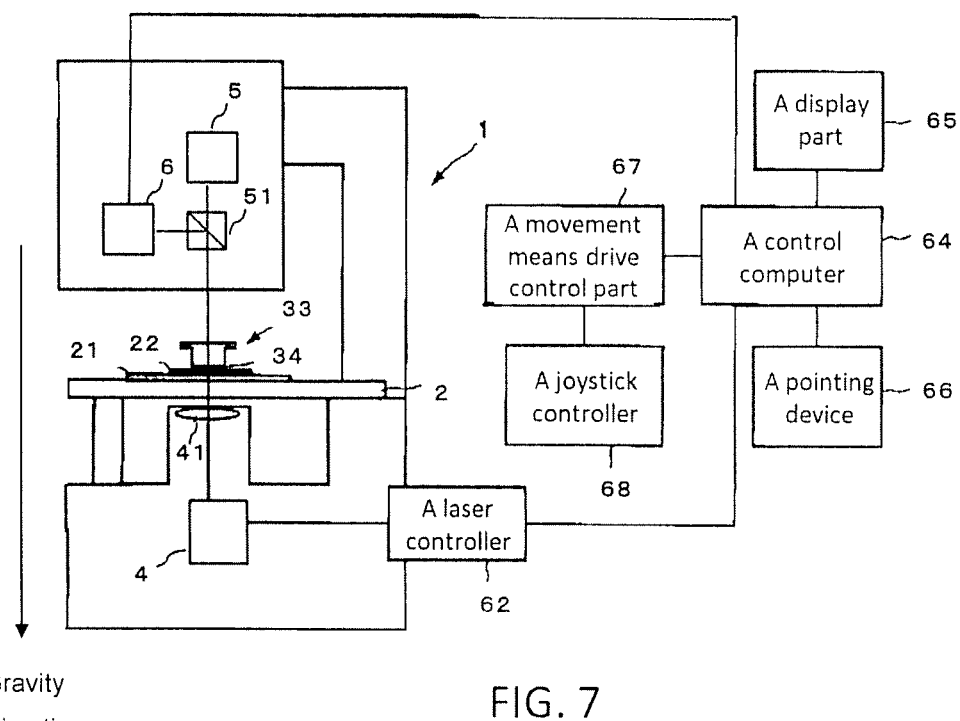
FIG. 7 is a sectional view of an example of the LMD 1 of the present invention and a schematic view of a system thereof.

FIG. 7 is a sectional view of an example of the LMD 1 of the present invention and a schematic view of a system thereof. In the LMD 1 illustrated in FIG. 7, the laser irradiation part 4 is provided below the device movement means 2. The laser irradiation part 4 is provided with a dissection laser light source not illustrated in the drawing and a collimator lens 41 disposed on the optical axis of the dissection laser light outputted from the dissection laser light source. The dissection laser light outputted from the dissection laser light source passes through the collimator lens 41, proceeds through the substrate 21 and the thermofusible film 22, and is radiated to the sample 34.

The laser irradiation part 4 is provided below the device movement means 2 in the embodiment illustrated in FIG. 7, but a configuration may be adopted whereby the laser irradiation part 4 is provided above the device movement means 2, and the dissection laser light can be radiated from the device substrate 21 side using a mirror system. A configuration may also be adopted whereby the dissection laser light can be radiated via the sample, by forming the frame 33 to be hollow and using an optically transparent material to form the slide 35 for mounting the sample. Furthermore, the embodiment illustrated in FIG. 4 may be configured so that the dissection laser light can be radiated via the sample by forming the arm 32 from an optically transparent material or forming a notch in the portion thereof where the sample is positioned. Other configurations are also possible insofar as the sample 34 is disposed on a top side, the device 20 having the thermofusible film 22 for adhering a collected sample is disposed on a bottom side, and a sample can be excised and adhered to the thermofusible film 22 by dissection laser light irradiation.

The light source 5 and the imaging apparatus 6 are disposed above the sample 34. Light emitted by the light source 5 is radiated to the sample 34 through an optical lens not illustrated in the drawing, the condenser lens, and the hollow portion of the frame 33. A half mirror 51 is provided on the optical axis of the light radiated from the light source 5, and the imaging apparatus 6 is disposed so that an imaging surface is positioned at the image formation position of observation light on the optical axis of light split by the half mirror 51.

A laser controller 62 is connected to the laser irradiation part 4, and the laser controller 62 is connected to a control computer 64. A display part 65, a pointing device 66 such as a mouse, for example, the imaging apparatus 6, and the movement means drive control part 67 for controlling driving of the device movement means 2 and the sample movement means 3 are also connected to the control computer 64.

The control computer 64 is a personal computer or the like in which software dedicated for the LMD 1 of the present invention is incorporated, and the control computer 64 is configured so that the output state of the dissection laser light outputted from the dissection laser light source is controlled by the laser controller 62, and a pulse signal and a power supply to the drive source of the device movement means 2 and the sample movement means 3 are controlled by the movement means drive control part 67 on the basis of a command from the control computer 64.

A joystick controller 68 is connected to the movement means drive control part 67. A joystick not illustrated in the drawing is incorporated into the joystick controller 68, and a pulse signal corresponding to manipulation of the joystick is fed to the sample movement means 3. For example, a configuration is adopted whereby the rotation direction of the drive source and selection of the drive source of the sample movement means 3 to which to send a pulse signal are determined by the inclination direction of the joystick, the pulse signal is generated by oscillation at a frequency corresponding to the inclination angle of the joystick, the drive source rotates, and the sample movement means 3 thereby moves. The joystick controller 68 is not essential, and the drive source for the sample movement means 3 may be selected and the rotation direction of the drive source may be controlled without the use of a joystick by displaying an image captured by the imaging apparatus 6 in the display part 65 and performing control so that the location indicated by the pointing device 66 is at the center of the display part 65, or producing the display part 65 from a screen having touch capability and performing control so that a touched location is at the center of the display part 65, for example.

The procedure whereby a sample is excised by the LMD 1 of the present invention, and the operation of the dedicated software incorporated in the control computer 64 will next be described.

First, power to the LMD 1 is turned on and the dedicated software of the control computer 64 is started, and the device movement means 2 is moved to a predetermined position for initialization in accordance with an automatically executed initialization operation. Origin position detection is then performed by an origin detector, and the device movement means 2 moves to a dissection laser light irradiation region separated a predetermined distance from the origin and waits. The position of the device movement means 2 during waiting is a position at which the high-hydrophilicity regions of the thermofusible film 22 of the device 20 fixed on the device movement means 2 are in the dissection laser light irradiation region and an irradiation region of illumination light. In this state, the slide 35 to which the sample 34 is fixed is attached to the arm 32 directly or via the frame 33.

Illumination light is then radiated from the light source 5 to the sample 34 on the slide 35, and an image of observation light of the sample 34 is captured by the imaging apparatus 6 through the half mirror 51 and projected on the display part 65. At this time, the position of the sample movement means 3 is finely adjusted by the joystick controller 68 or a touch function or the like of the display part 65, and a position on the sample 34 from which collection is desired can be displayed in the display part 65.

When samples are to be continuously excised from the sample 34, a range of desired collection from the sample 34 displayed in the display part 65 is set through use of the pointing device 66 or the like, as illustrated in FIG. 6. On the basis of the diameter of the radiated dissection laser light, the control computer 64 calculates the positional coordinates of the sample to be irradiated by the dissection laser light so that the set range of the sample 34 can be continuously excised. The above example is of a case in which the sample 34 is continuously excised, but the positional coordinates of the sample to be irradiated by the dissection laser light may also be set so that the set range of the sample can be excised at an arbitrary spacing, for example.

Positional coordinates for adhering collected samples to the high-hydrophilicity regions 221 of the thermofusible film 22 are then set. The positional coordinates may be set by selecting from a list stored in the control computer 64 in advance in accordance with a design of the device to be used, e.g., 96 wells, 384 wells, or another number of wells, or coordinate positions may be calculated by the control computer 64 by inputting a desired spacing value to the control computer 64. In a storage means (not illustrated in the drawing) of the control computer 64, the control computer 64 correlates and stores the selected or calculated positional coordinates with an image of the sample captured by the imaging apparatus 6, and the positional coordinates of the sample irradiated by the dissection laser light and the positional coordinates at which the samples irradiated by the dissection laser light are adhered to the high-hydrophilicity regions 221 of the thermofusible film 22. (The stored information is sometimes referred to below as "collection information.")

In a case in which collection positions on the sample 34 are arbitrarily set, locations of the sample 34 displayed in the display part 65 for which irradiation by the dissection laser light and collection are desired are set through use of the pointing device 66 or the like, or are automatically identified by image analysis software using color information, staining intensity, or the surface area, circumference, major axis, shape, or other characteristics of a specified object, the positional coordinates of each location are set, and the positional coordinates of the locations set in the storage means of the control computer 64 are stored in advance. At this time, it is preferred that marks or numbers in the order of setting be displayed also on the locations of the sample 34 displayed in the display part 65 and set by the pointing device 66 to display which locations of the sample are to be excised.

After the collection information is stored by the procedure described above, the movement means drive control part 67 controls driving of the sample movement means 3 on the basis of the positional coordinate information of the collection information so that the location of the sample 34 first to be irradiated by the dissection laser light is positioned on the optical axis of the dissection laser light. The movement means drive control part 67 then controls driving of the sample movement means 3 on the basis of the positional coordinate information stored in the storage means so that the location of the high-hydrophilicity region of the thermofusible film 22 to which the first collected location of the sample 34 is adhered is positioned on the optical axis of the dissection laser light, and so that the sample 34 is then pressure-bonded to the thermofusible film 22.

In response to an instruction from the control computer 64, the laser controller 62 then performs control so that the dissection laser light is radiated from the dissection laser light source. After irradiation by the dissection laser light, the movement control means 67 controls driving of the sample movement means 3 to move the sample 34 upward, thereby peeling the sample 34 in a state in which the first collected sample 34 is adhered to the high-hydrophilicity region 221 of the thermofusible film 22. The procedure described above is the repeated until all of the pre-set samples to be collected are adhered to and peeled from the high-hydrophilicity regions 221 of the thermofusible film 22. The sample 34 adhered to the thermofusible film 22 may be analyzed by a publicly known method as described above.

When analysis results obtained by analysis of the collected samples 34 are stored in the storage means, the positional coordinates of each of the collected samples 34 and the analysis results thereof are correlated and stored in the storage means. (The stored information is sometimes referred to below as "analysis information.") An image is configured on the basis of the collection information and analysis information stored in the storage means, and it is thereby possible to display an image of a sample as well as to display analysis results of a sample which had been included at a location where a sample was collected.

When the LMD 1 and the analysis apparatus are separate, display of a sample image and analysis results may be performed by a configuration in which the analysis information is read by the control computer 64 of the LMD 1, an image is configured on the basis of the read analysis information and the collection information stored in the storage means of the LMD 1, and the sample image and the analysis results are displayed together in the display part 65, for example. When display in a display part of the analysis apparatus is desired, display may be performed by a configuration in which the collection information is read by a control computer of the analysis apparatus, an image is configured on the basis of the read collection information and the analysis information stored in a storage means of the analysis apparatus, and the sample image and the analysis results are displayed together in the display part of the analysis apparatus.

In the case of an analysis apparatus having the LMD 1 built-in, an image may be configured on the basis of the collection information and the analysis information, and the sample image and the analysis results may be displayed together in the display part. A configuration may also be adopted whereby the collection information and the analysis information are read by a personal computer or the like separate from the LMD 1 and the analysis apparatus, and the sample image and the analysis results are displayed together in a display part of the personal computer. The apparatus of the present invention can also be automated, and is therefore capable of remote manipulation and analysis, and also enables analysis and examination to be performed from a separate location.

Two-dimensional analysis from a collected sample is performed in the example described above, but three-dimensional imaging is also possible using the LMD 1 and the analysis apparatus incorporating the LMD 1 of the present invention. For example, when a plurality of sample sections are prepared from the same tissue and collection information and analysis information are acquired by the same procedure as above for each sample section, three-dimensional imaging can easily be performed by correlating and storing which order number a sample section has among the sample sections prepared from the tissue. As means for ensuring that positional misalignment does not occur in an image of the sections at this time, (1) a colored nylon floss or the like is inserted as a position marker at appropriate locations of an embedding agent during embedding of the specimen, and (2) position markers are created by creating measurement marks or the like by microcutting or marking using India ink or the like at a plurality of specific locations in the specimen, and an image subjected to position correction prior to sample collection may be displayed by an image processing function incorporated in the control computer 64. When the sections are extremely thin, consecutive sample sections excised from the tissue are almost the same size. Therefore, after collection information is acquired by the above procedure for the first sample, when an image captured by the imaging apparatus 6 of the second sample is displayed in the display part 65, the image of the second sample may be displayed so as to be superposed on the first image, and a sample collection range may be set in the second image to be the same as the sample collection range set in the first image.

The thermofusible film 22 melts by absorbing the dissection laser light and re-solidifies when irradiation thereof by the dissection laser light is stopped, and when the thermofusible film 22 solidifies, the thermofusible film 22 adheres to a sample excised by the dissection laser light. Therefore, the positional coordinates of irradiation by the dissection laser light on the sample 34 are kept the same, and after the sample collected by the first irradiation by the dissection laser light is adhered at a pre-set position on the thermofusible film 22, only the thermofusible film 22 is moved to the adhesion position of the sample next to be collected, without movement of the sample 34, and the dissection laser light is radiated. The molten thermofusible film 22 then sinks into a recess into which the sample was previously collected, but because the thermofusible film 22 is viscous, the molten thermofusible film 22 is pulled back by the non-molten thermofusible film 22 during solidification thereof, and therefore adheres the sample excised by the dissection laser light, and the excised sample can be collected from the sample 34 fixed to the slide 35.

When a sample is collected by the method described above, the amount of the sample that can be collected potentially varies according to the depth of the recess. A measurement apparatus for measuring the depth of the sample 34 after collection may be provided to enhance quantitativity during three-dimensional imaging. It is possible to measure the depth of the recess and determine the amount of the sample collected, and quantitativity is therefore enhanced.

Examples are presented below to specifically describe the present invention, but the examples are presented merely for description of the present invention and as references for definite embodiments thereof. The following examples are given to describe specific definite embodiments of the present invention, but do not limit or restrict the scope of the invention disclosed in the present application.

EXAMPLES

Example 1

(Production of the LMD)

An LMD of the present embodiment was produced by furnishing an upright microscope as a base with a stepping motor (BioPrecision; manufactured by Ludl Electronic Products Ltd.) as a drive source, 3D-A-LCS software (manufactured by Lucir Inc.) as a movement means drive control part, and a Z-808-200-SM (manufactured by Lucir Inc.) as a dissection laser light source.

Example 2

(Production of the Device)

Figure 8:
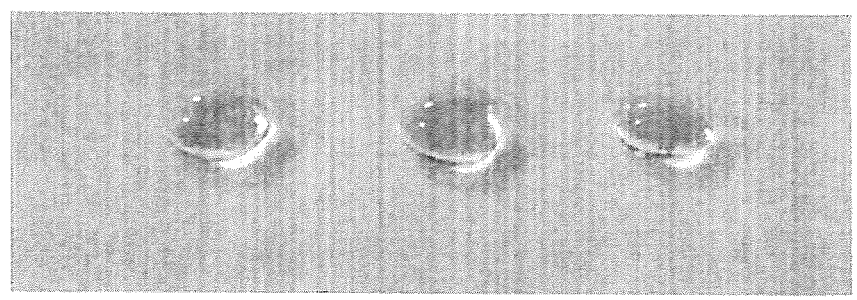
FIG. 8 is a photograph substituting for a drawing, showing water which has been dripped onto the high-hydrophilicity regions of the device produced in Example 2.

A thermofusible film was formed by spin-coating a glass slide with EVA (manufactured by Toyo ADL Corporation). The thickness of the thermofusible film was approximately 5 μm. The device of the present embodiment was then produced by printing the portion of the thermofusible film corresponding to the low-hydrophilicity region with a water-repellent ink (SS25; manufactured by Toyo ADL Corporation) using an inkjet printer. FIG. 8 is a photograph showing water which has been dripped onto the high-hydrophilicity regions of the produced device. As is apparent from the photograph, the dripped water remains in the high-hydrophilicity regions.

(Production of the Pressing Means)

Example 3

Figure 9:
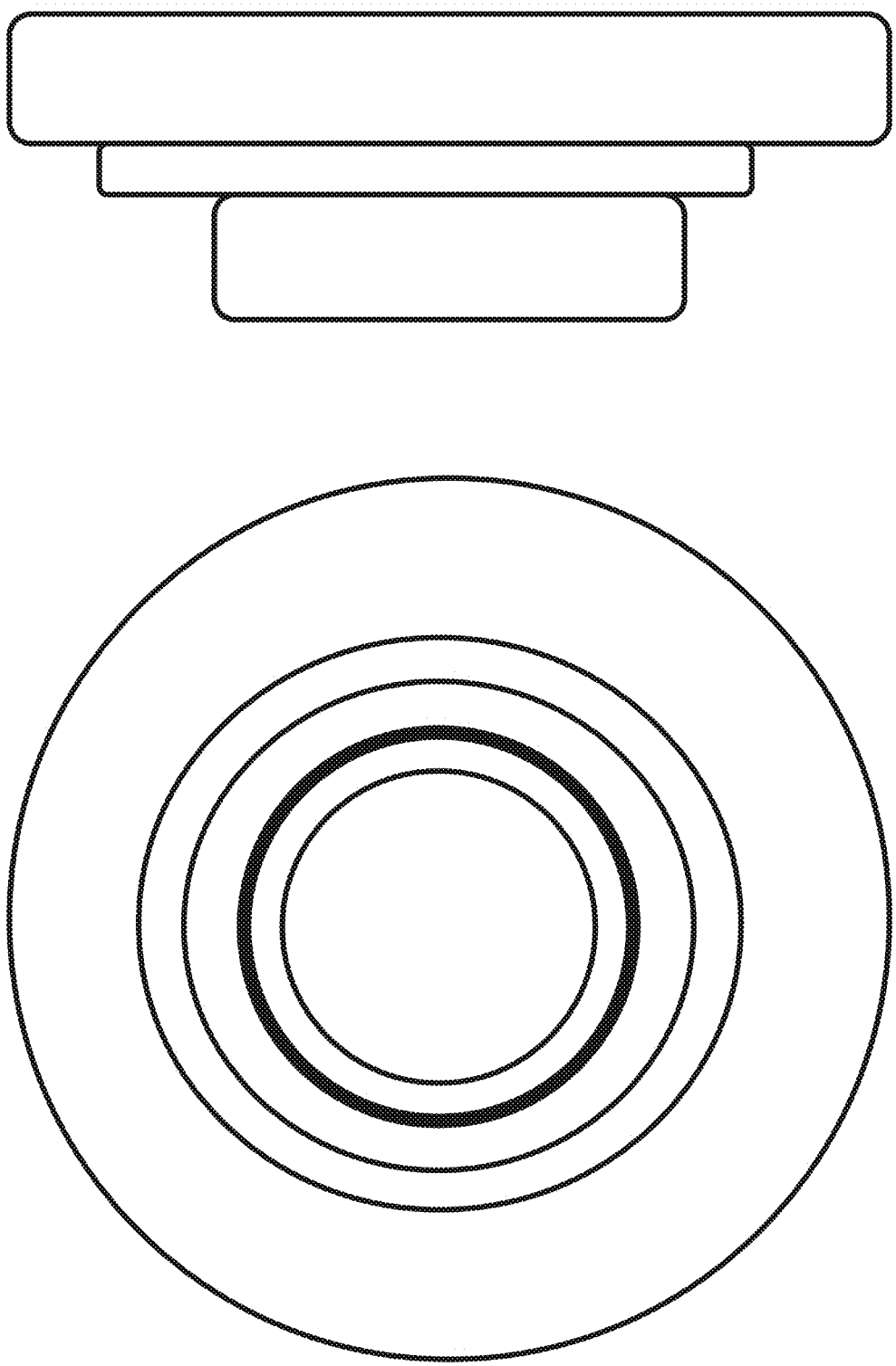
FIG. 9 is a photograph substituting for a drawing, FIG. 9(1) being a photograph taken from a side of the pressing means produced in Example 3, and FIG. 9(2) being a photograph taken from an underside thereof.

The pressing means was produced from hollow stainless steel. FIG. 9(1) is a photograph taken from a side of the pressing means, and FIG. 9(2) is a photograph taken from an underside thereof. The diameter of the hollow portion thereof was approximately 9 mm, and the weight was approximately 33 g. A recess was also provided on the outside of the hollow portion, and a rubber anti-slipping member was inserted therein.

Example 4

A pressing means having approximately half the weight of that of Example 3 was produced by reducing the thickness of a top part of the pressing means of Example 3.

(Collection of a Sample by LMD when Pressing is Varied)

Example 5

Samples were excised using LMD and adhered to the device by the procedure described below.

(Acquisition of Analysis Tissue)

The brain of an APP/PS1 mouse (age: 10 months, weight: approximately 25 g), acquired by the procedure described below was used.

1. After being anesthetized with diethyl ether, a mouse was placed in a supine position and the limbs thereof were fixed.

2. After laparotomy, the diaphragm was incised, and the left and right ribs were incised toward the head.

3. The xiphoid process was gripped, inverted toward the head, and fixed using forceps, and the heart was exposed.

4. The left ventricle was punctured by a winged needle, and a 1×PBS solution (physiological saline) was injected.

5. The right auricle was incised using scissors, and blood was removed and perfusion performed using approximately 70 mL of physiological saline.

6. After perfusion, the head was cut off and the brain was extracted after craniotomy.

7. The extracted brain was cut in half in sagittal section and arranged with the sectional surface (cut face) thereof downward, and then placed in an embedding agent (OCT compound) and frozen to produce a frozen block.

(Production of Sample Section)

A sample section was produced by the procedure described below from the frozen block obtained by the procedure described above.

1. A section having a thickness of 10 μm was produced from the frozen block. An uncoated glass slide was used.

2. A frozen section was dried by the procedure described below.

(1) 100% acetone 10 minutes
(2) PBS 1 minute
(3) 70% ethanol 1 minute
(4) 100% ethanol 1 minute
(5) 100% ethanol 1 minute
(6) 100% xylene 2 minutes
(7) 100% xylene 2 minutes (Excision of Samples from Section and Adhesion Thereof to Thermofusible Film)

Samples at set locations were collected from the produced frozen section and adhered to the device by the procedure described below.

(1) Power was turned on to the LMD produced in Example 1 and the device movement means was initialized, after which the device was set in the device movement means. The pressing means produced in Example 3 was inserted in a hole in the distal end of the arm of the sample movement means, after which a glass slide with the sample section adhering thereto was attached to the distal end of the pressing means with a sample surface thereof facing downward.

(2) An image of the frozen section was displayed in the display part, and the positional coordinates of irradiation of the sample by the dissection laser light were set.

(3) Positional coordinates were set to adhere collected samples at predetermined positions on the device.

Figure 10:
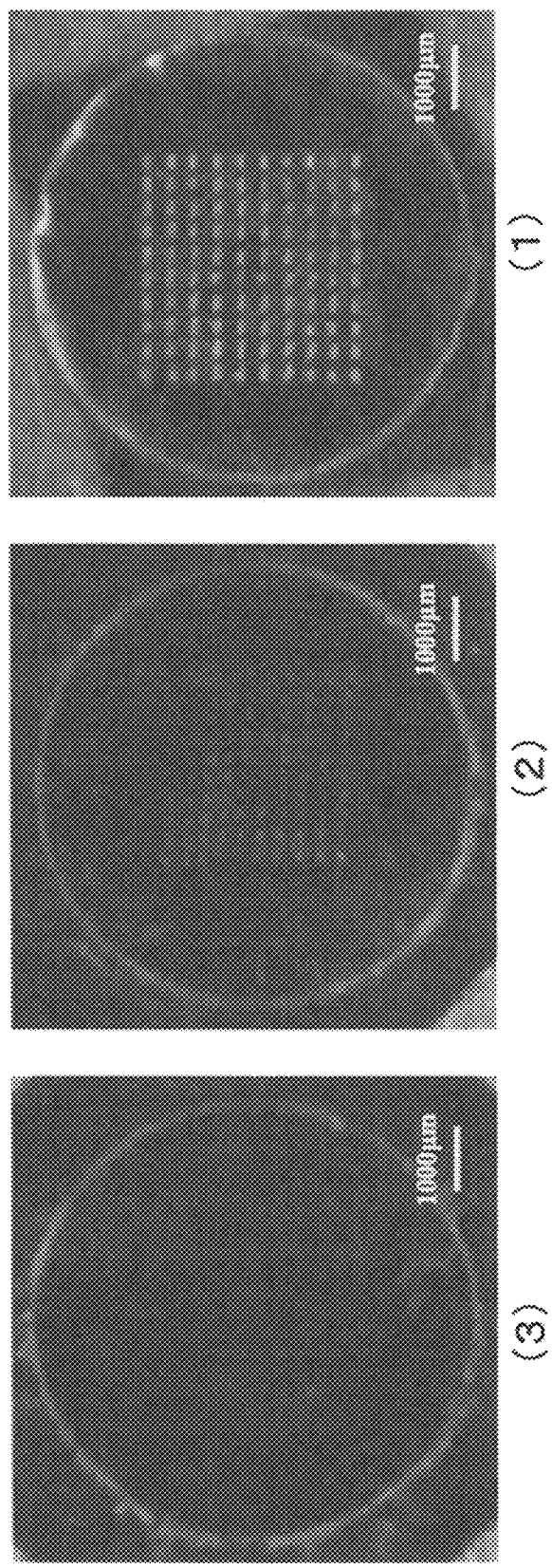
FIG. 10 is a photograph substituting for a drawing, FIG. 10(1) being an enlarged photograph of the surface of the device of Example 5, FIG. 10(2) being an enlarged photograph of the surface of the device of Example 6, and FIG. 10(3) being an enlarged photograph of the surface of the device of Comparative Example 1.

(4) In accordance with the Live Cell Imaging System V7 (manufactured by Lucir Inc.) program, the sample was irradiated by the dissection laser light (output: 300 mA, irradiation time: 5 msec, irradiation diameter: 30 µm) in accordance with the positional coordinates set in (2) and (3) above, and excised samples were adhered/recovered at preset locations on the device. The laser intensity was adjusted to give a sample diameter of 60 µm for the samples collected in this example. Due to the program and the size of the high-hydrophilicity regions of the produced device, the positional relationship was adjusted so that a plurality of collected samples were adhered in a single high-hydrophilicity region on the device. FIG. 10(1) is an enlarged photograph of an adhesion surface for the samples excised in Example 5.

Example 6

Samples were excised by the same procedure as in Example 5, except that the pressing means produced in Example 4 was used instead of the pressing means of Example 3. FIG. 10(2) is an enlarged photograph of the device surface to which the samples excised in Example 6 were adhered.

Comparative Example 1

Without the use of a pressing means, a glass slide with a sample section adhering thereto was attached directly to the arm of the sample movement means, the arm was manipulated in a state of no pressing, and the dissection laser light was radiated in the same manner as in Example 5. FIG. 10(3) is an enlarged photograph of the device surface of Comparative Example 1.

As is apparent from FIGS. 10(1) through 10(3), closely adhering a sample to the thermofusible film of the device using the pressing means during LMD enables the sample to be transferred to the thermofusible film, and the amount of the sample transferred also varies according to the degree of pressing.

INDUSTRIAL APPLICABILITY

In LMD according to the present embodiment, the device for adhering a collected sample is disposed below the slide on which the sample is mounted. It is therefore possible to send an unmodified sample on to a subsequent process without changing the direction or the like of the device after sample collection. Furthermore, the surface of the device of the present invention is configured as a planar well structure, and samples collected by LMD can therefore be subjected to various pre-processing or analysis on the device. Consequently, the present invention can be useful as an apparatus for tissue analysis in a medical institution, a university medical department or other research institution, a general hospital, or the like.

What is claimed is:

1. A laser microdissection apparatus, comprising:
sample movement means for retaining a slide on which a sample is mounted and moving the slide in a horizontal axis and a vertical axis along the gravity direction, the sample movement means comprising a frame for retaining the slide and an arm for retaining the frame;
device movement means on which a device having a thermofusible film for transferring a sample can be mounted, the device movement means capable of moving the device in the horizontal axis;
pressing means for pressure-bonding the slide and the device having the thermofusible film, the pressing means including the frame and the arm;
a laser irradiation part for irradiating the sample with a dissection laser light, excising the sample in a location irradiated with the dissection laser light, and adhering the excised location to the thermofusible film as a collected sample;
storage means for correlating and storing positional coordinates of the sample in the location irradiated by the dissection laser light and positional coordinates of the thermofusible film in a location where the collected sample is adhered; and
a movement means drive control part for controlling driving of the sample movement means and the device movement means on the basis of the positional coordinates of the sample and the positional coordinates of the thermofusible film stored in the storage means, wherein:
the sample movement means is located above the device movement means in the gravity direction,
the dissection laser light is radiated through the device onto the sample from below the device in the gravity direction, and
the arm comprises an insertion hole configured to retain the frame.

2. The laser microdissection apparatus of claim 1, wherein:
the sample movement means has a motor for driving the arm, and
the pressing means includes the motor, and the arm is configured to be urged toward the device by the motor.

3. The laser microdissection apparatus of claim 1, comprising the device having a substrate and the thermofusible film formed on the substrate to transfer the sample.

4. The laser microdissection apparatus of claim 3, wherein a surface of the thermofusible film is formed of regions having different hydrophilicity, a high-hydrophilicity region being surrounded by a low-hydrophilicity region.

5. An analysis apparatus comprising the laser microdissection apparatus of claim 1.

6. The analysis apparatus of claim 5, wherein the analysis apparatus is one type selected from a group consisting of a mass spectrometer, an analysis apparatus including chromatography, an elemental analysis apparatus, a nucleic acid sequence analysis apparatus, and a microchip analysis apparatus.

7. A sample collection method for transferring a sample onto a device having a thermofusible film, using the laser microdissection apparatus of claim 1, the sample collection method comprising:
a step for superposing a position of the sample to be transferred above a position in the gravity direction, to which the sample is to be transferred, of the thermofusible film of the device;

a pressing step for pressure-bonding the sample and the thermofusible film of the device; and a sample collection step for radiating dissection laser light from below the device in the gravity direction, excising a location of the sample irradiated by the dissection laser light, and adhering the excised location of the sample to the thermofusible film as a collected sample.

8. A device used in the laser microdissection apparatus of claim 1, wherein:

the device includes:
- a substrate; and
- a thermofusible film formed on the substrate to transfer a sample, a surface of the thermofusible film is formed of regions having different hydrophilicity by a hydrophilizing treatment of the surface of the thermofusible film, a high-hydrophilicity region being surrounded by a low-hydrophilicity region, and the high-hydrophilicity region of the thermofusible film contains more hydrophilic substitutes than the low-hydrophilicity region due to the hydrophilizing treatment.

9. The device of claim 8, wherein an electroconductive layer is formed between the thermofusible film and the substrate.

10. The laser microdissection apparatus of claim 1, further comprising:

a light source for radiating light for observing the sample; and an imaging apparatus for acquiring an image, wherein the light source and the imaging apparatus are located above the sample movement means in the gravity direction.

* * * * *